Feb. 28, 1939.  B. C. BECKER  2,148,599
SUCTION CLEANER
Filed Aug. 14, 1937
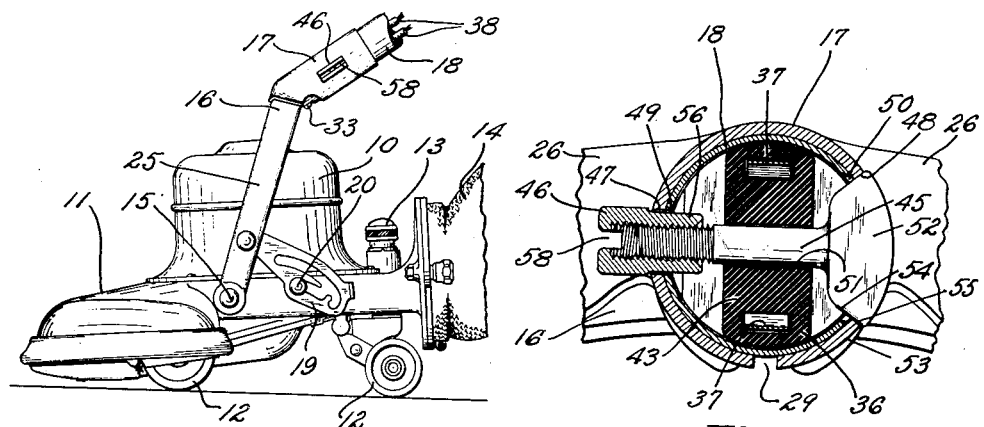
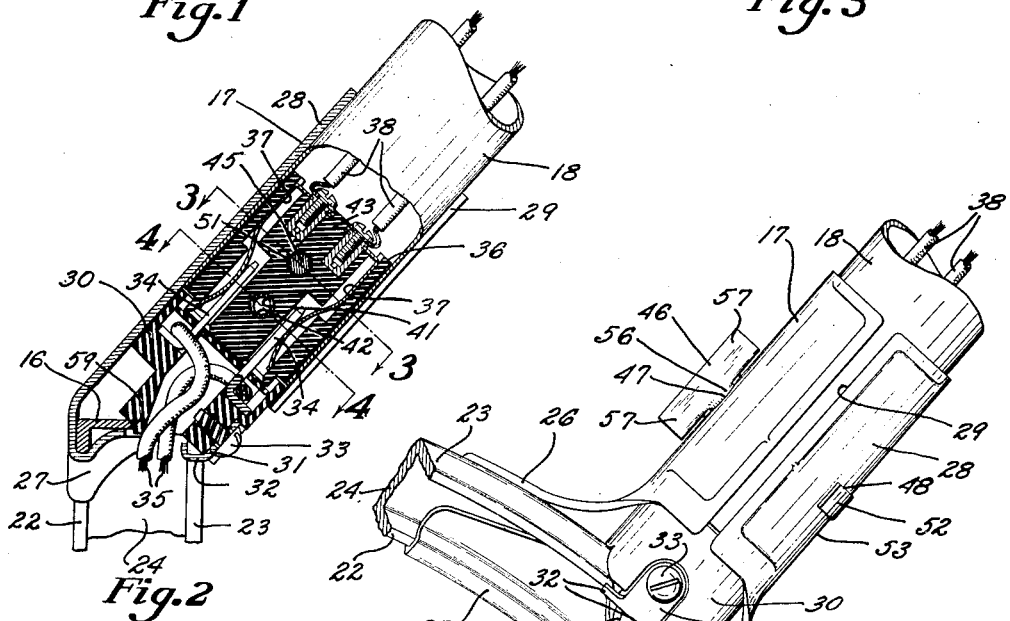
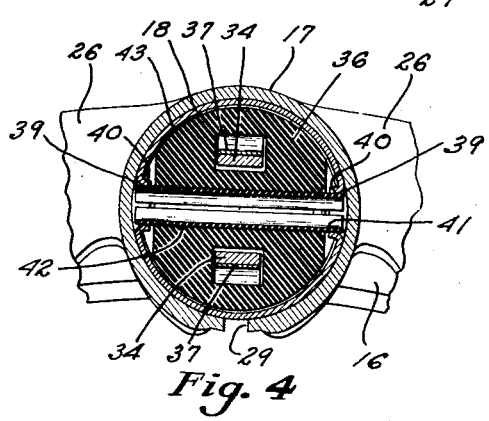
INVENTOR
Bernard C. Becker
BY Harry S. Demarse
ATTORNEY Patented Feb. 28, 1939

2,148,599

UNITED STATES PATENT OFFICE 2,148,599

SUCTION CLEANER

Bernard C. Becker, Canton, Ohio, assignor to The Hoover Company, North Canton, Ohio, a corporation of Ohio Application August 14, 1937, Serial No. 159,033

7 Claims. (Cl. 174—46)

This invention relates to suction cleaners, and more particularly to detachable handle construction and means for securing an electrical connector in the handle.

An object of the invention is to provide means for securing a female plug in the lower end of a handle prior to assembling the latter in a bail socket. Another object is to provide means for securing a handle and female plug in a bail socket. A further object is to provide a bail socket without projecting portions to thereby increase the pleasing appearance of the suction cleaner.

Other objects and advantages of the invention will be apparent from the following specification and drawing, wherein:

Fig. 1 is a fragmentary side elevation of a suction cleaner embodying one modification of the invention;

Fig. 2 is an enlarged fragmentary section through the joint between the bail socket and handle;

Fig. 3 is a section taken along the line 3—3 of Fig. 2;

Fig. 4 is a section taken along the line 4—4 of Fig. 2;

Fig. 5 is an elevational view of the bottom side of the bail socket and handle.

An embodiment of the invention is herein disclosed in a suction cleaner having a motor housing 10, carried by a main body 11 supported on wheels 12 provided with adjusting means 13 to raise and lower the cleaner nozzle with respect to the surface being cleaned. Connected to the exhaust passage of the suction cleaner is a bag 14. Pivotally mounted at 15, to the cleaner body 11, is a handle bail 16 provided with a handle bail socket 17 for receiving a handle 18 to move the cleaner over the surface to be cleaned. The bail 16 is of channel cross-section having flanges 22 and 23 connected to a web portion 24, and is provided with bifurcated arms 25, the lower ends of which are pivoted at 15 to the cleaner body 11. A handle control device 19 is pivotally carried by the handle 18 and cooperates with a pin 20 on the cleaner body 11 to hold the handle in a plurality of selected positions with respect to the cleaner.

The handle bail socket 17 has oppositely flared portions 26 which rest upon the upper surface of the bail 16, and has a lower end 27 bent around the flange 22 and may be welded to the web 24 to secure the socket to the bail. The upper end 28 of the bail socket 17 is split as indicated at 29 to allow for expansion and contraction thereof for the removable reception of the handle 18. Disposed in the lower end of the bail socket 17 and resting on the bail 16 is a male plug 30 removably secured in the bail socket 17 by means of a clip 31 having laterally extending portions 32 contoured to embrace the bail flange 23 and is secured to the male plug 30 by a screw 33. The male plug 30 is provided with suitable contacts 34, 34 connected to leads 35, 35 which extend through an opening 59 in the web of the bail and along the channel of one of the bail arms 25 to the motor in the housing 10.

Disposed in the lower end of the handle 18 is a female plug 36, provided with suitable contacts 37, 37 adapted to engage the male prongs 34, and connected to the female contacts are power leads 38, 38 extending upwardly in the handle to a switch, not shown, which controls the circuit to the motor.

In order to properly locate the female plug 36 in a predetermined position in the handle 18 with respect to the male prongs 34, prior to assembly in the bail socket 17, the handle 18 is provided with diametrically arranged openings 39, 39 each provided with an inturned annular flange 40 for the reception of a cylindrical member 41, of insulating material, which extends through an opening 42 in the insulated body 43 of the female plug 36 to thereby secure the latter in the handle in the proper pre-determined position for reception of the male prongs 34.

The handle 18 is detachably secured in the bail socket 17 by means of a bolt 45 and a nut 46. The bolt 45 extends through diametrically opposed openings 47 and 48 in the bail socket 17, and openings 49 and 50 in the handle 18, the bolt 45 also passing through a bore 51 in the insulated body portion 43 of the female plug 36. It will be noted that the head 52 of the bolt 45 lies flush with the outer surface 53 of the bail socket, and is tapered at 54 to rest upon the corresponding tapered surface 55 of the bail socket opening 48. The bolt head 52 and opening 48 are rectangular to prevent the bolt 45 from turning during manipulation of the nut 46. The nut 46 has a cylindrical section 56 which extends through the aligned openings 47 and 49 into the handle 18, and also has laterally extending portions 57 to provide a purchase for the fingers of the operator assembling the handle in the bail socket. A slot 58 is provided in the nut 46 for the reception of a tool to assist in this assembly.

In order to assemble the device, the male plug is disposed in the bail socket 17, the motor leads 35 passing through the opening 59 for connection to the motor. The clip 31 is then arranged about the bail flange 23 and the screw 33 threaded into the male plug 30 to properly position the latter in the bail socket. Prior to inserting the handle in the bail socket 17, the female plug 36 is disposed in the lower end of the handle 18 and rotated until the bore 42 is in alignment with the openings 39, whereupon the plug locating and securing member 41 is placed in the openings 39 and 42 to secure the female plug in its proper position. The handle 18 is then disposed in the bail socket with the large openings 48 and 50, and smaller openings 47 and 49 in alignment for the reception of the bolt 45 which also passes through the bore 51 in the insulating body 43 of the female plug. The nut 46 is threaded onto the bolt 45, which is prevented from turning due to the rectangular contour of the opening 48 and the bolt head 52, until the tapered bolt head rests snugly in the tapered bail socket opening 48 to thereby lie flush along the outer surface of the bail socket. It will be seen that the enlarged bolt head 52 and cylindrical section 56 of the nut 46 also extend through the wall of the bail socket into the handle to thereby securely hold the handle in the bail socket.

I claim:

1. A handle construction for a traveling motor driven machine, comprising a socket member carried by the machine, an electrical member disposed in said socket member, means securing said electrical member in said socket member, a handle detachably disposed in said socket member, an electrical member in said handle cooperating with said first mentioned electrical member, means for securing said cooperating electrical member in said handle, and means extending through said socket member, handle and cooperating electrical member to secure said parts together.

2. In a detachable handle construction, a socket member, an electrical member disposed in said socket member, a handle detachably disposed in said socket member, an electrical member having an insulating portion received in said handle cooperating with said first mentioned electrical member, means extending through said insulating portion of said cooperating electrical member and through said handle for securing said cooperating electrical member in said handle, and means extending through said socket member, electric insulating body portion and handle for detachably securing said parts together.

3. In a detachable handle construction, a socket member, an electrical member disposed in said socket member, a handle detachably disposed in said socket member, an electrical member having an insulating portion received in said handle cooperating with said first mentioned electrical member, and means extending through said socket member, electric insulating portion and handle for detachably securing said parts together.

4. In a detachable handle construction, a socket member, an electrical member received in said socket member, a handle detachably received in said socket member, another electrical member having an insulating portion disposed in said handle for cooperation with said first mentioned electrical member, and means for detachably securing said handle and said another electrical member in said socket member comprising a nut and bolt, said bolt having its head extending through aligned openings in said socket member and handle, and having a shank portion extending through said insulating portion of said another electrical member and through aligned openings in said socket member and handle, said nut being threaded on said shank portion.

5. In a detachable handle construction, means defining a socket, electrical contacts disposed in said socket, a handle detachably received in said socket, other electrical contacts having an insulating portion disposed in said handle for cooperation with said first mentioned electrical contacts, means for securing said insulating portion in said handle, and means for detachably securing said handle in said socket comprising a bolt member and nut member, one of said members extending through aligned openings in said socket means and said handle.

6. A handle construction for a travelling motor-driven machine, comprising a member connected to the machine, a socket secured to said member for receiving a handle, an electrical connector in said socket, clamping means having a portion affixed to said member and a portion extending along said electrical connector, and means for securing said second mentioned portion to said electrical connector to hold the latter in said socket and rigidly to said member.

7. A handle construction for a traveling motor-driven machine, comprising a socket member carried by the machine, a handle detachably disposed in said socket member, an insulated electrical connector in said handle, means for securing said electrical connector in said handle, and means extending through said socket member, said handle and the insulation of said electrical connector to secure said parts together.

BERNARD C. BECKER.